(12) United States Patent
Grimes et al.

(10) Patent No.: US 8,191,015 B2
(45) Date of Patent: May 29, 2012

(54) PERSONALIZED CONTENT MANAGEMENT

(75) Inventors: Tom Grimes, Ottawa (CA); Khanh Mai, Alpharetta, GA (US)

(73) Assignee: Andrews Kurth LLP, Washington, DC (US)

( * ) Notice: Subject to any disclaimer, the term of this patent is extended or adjusted under 35 U.S.C. 154(b) by 0 days.

(21) Appl. No.: 11/979,421

(22) Filed: Nov. 2, 2007

(65) Prior Publication Data

US 2008/0065991 A1 Mar. 13, 2008

Related U.S. Application Data

(63) Continuation of application No. 10/946,618, filed on Sep. 22, 2004, now abandoned, which is a continuation of application No. 09/878,232, filed on Jun. 12, 2001, now abandoned.

(60) Provisional application No. 60/210,747, filed on Jun. 12, 2000.

(51) Int. Cl.
  *G06F 3/048* (2006.01)

(52) U.S. Cl. ........ 715/841; 715/765; 715/771; 715/809; 715/970

(58) Field of Classification Search ................. 715/201, 715/716; 725/95
See application file for complete search history.

(56) References Cited

U.S. PATENT DOCUMENTS

| | | | |
|---|---|---|---|
| 5,933,605 A * | 8/1999 | Kawano et al. | 709/238 |
| 6,216,141 B1 * | 4/2001 | Straub et al. | 715/234 |
| 6,438,596 B1 * | 8/2002 | Ueno et al. | 709/226 |
| 6,766,352 B1 * | 7/2004 | McBrearty et al. | 709/203 |

* cited by examiner

*Primary Examiner* — Namitha Pillai
(74) *Attorney, Agent, or Firm* — Andrews Kurth LLP

(57) ABSTRACT

A personalized content manager is disclosed. The personalized content manager comprises an apparatus, system, method, and computer readable medium that includes or performs the steps of receiving input regarding the filtering of broadband content, filtering the broadband content with one or more content categories based on the filtering input, filtering the content with one or more of a plurality of content sources based on the filtering input, and generating a personalized content management interface screen that includes a list of titles of the filtered content.

15 Claims, 14 Drawing Sheets

```
<Program>
    <Title>David Coulthard wins Monaco GP</Title>
    <Description>David Coulthard won a gripping Monaco Grand Prix today, from Rubens
    Barrichello in 2nd and Giancarlo Fisichella who was third.</Description>
    <Rating>G</Rating>
    <Classification>AB013C24</Classification>
    <Category>
        <Name>Sport</Name>
        <Category>
            <Name>Race</Name>
            <Category>
                <Name>Formula 1</Name>
            </Category>
        </Category>
    </Category>
    <Image>DavidCoulthard.jpg</Image>
    <VideoTrailer>GPMonaco.mpg</VideoTrailer>
    <CachePath>David Coulthard wins Monaco GP</CachePath>
    <CacheFilename>s2274.htm</CacheFilename>
    <Scheduled>04/06/2000 15:00</Scheduled>
    <PPV>NO</PPV>
    <Cost>0</Cost>
    <ProgramID>12</ProgramID>
    <IP>224.1.2.3</IP>
    <TcpPort>2456</TcpPort>
    <BitRate>512</BitRate>
    <Expires>never</Expires>
</Program>
```

FIGURE 4

PERSONALIZED CONTENT MANAGEMENT

CROSS REFERENCE TO RELATED APPLICATIONS

This is a Continuation application of Ser. No. 10/946,618, filed Sep. 22, 2004, now abandoned, which in turn is a Continuation application of Ser. No. 09/878,232, filed Jun. 12, 2001, now abandoned, which in turn claimed the benefit of the priority of U.S. Provisional Patent Application Ser. No. 60/210,747, filed Jun. 12, 2000, and which all three applications are hereby incorporated by reference in their entirety. This application also hereby incorporates by reference U.S. patent application Ser. No. 09/835,529, filed Apr. 17, 2001, now abandoned.

BACKGROUND

1. Technical Field

The present invention is related to multimedia content delivery systems, and more particularly to systems that personalize or customize content.

2. Description of Related Art

Over the past ten years, the bandwidth capacity available to consumers for receiving content from the Internet and other networks has increased ten-fold and more. The increased bandwidth capacity has enabled consumers to download larger and larger files and other content, including rich media and multimedia content such as video clips, songs and movies. This increased bandwidth capacity has increased Internet usage and the potential for enjoyable and productive usage.

Despite the increased bandwidth capacity, however, prior to the present invention, there were no consumer-based broadband services that automate the delivery of rich media and multimedia content directly to the consumer's personal computer (PC) or Internet access device. Prior to the present invention, there were no service providers optimizing the use of a broadband connection by distributing multiple channels of rich media content and providing a mechanism to automate the selective tuning to desired material. Prior to the present invention, there were no mechanisms available to support Internet protocol ("IP") recording and hence the time-shifted viewing of rich media material broadcast to the consumers PC or Internet access device.

Likewise, there has been an increase in the efforts of companies to gather information about consumers and to target consumers with advertising. Despite this effort, however, prior to the present invention there was no user interface that incorporates a profiling engine in offering personalized access to available material. Indeed, prior to the present invention, there was no personalized offering of rich media material to consumer PCs and Internet access devices.

Indeed, for the consumer of rich multimedia material, there does not exist a system of personalizing the consumer's access to the rich multimedia material. No systems exist that allow the consumer to view lists of content filtered by category and source. Likewise, no systems exist that allow the consumer to view lists of content filtered or sorted by a personal profile. Further, no systems exists that provide a dynamic interface that a consumer can modify to their liking to display differently filtered and sorted lists of content.

SUMMARY OF THE INVENTION

An advantage of the present invention is that it overcomes the disadvantages and shortcomings of the prior art. Another advantage of the present invention is that it provides a personalized content manager, whereby a user can personalize multimedia content received from a multimedia content delivery system. Another advantage of the present invention is that it provides an easy to use, customizable interface for viewing, listening or otherwise accessing (collectively referred to as "viewing") multimedia content.

These and other advantages of the present invention are achieved by a personalized content management interface, comprising a dynamic graphical user interface ("GUI"). The dynamic GUI comprises one or more category buttons capable of being selected, one or more source buttons, including a source button for real-time stream, capable of being selected, and a content list. Each category button represents a category of content that may be accessed by a user. Likewise, each source button represents a source of content that may be accessed by a user. One category button and one source button are selected and the content list includes any content, if any, that is within the category of content represented by the selected category button and that is provided by the source of content represented by the selected source button.

These and other advantages of the present invention are also achieved by a method of personalized content management. The method comprises the steps of displaying a personalized content management interface, selecting one or more category buttons, selecting one or more source buttons, wherein the source buttons include a multicast stream button, and generating a list of content that comprises content titles for content that is within the category of content represented by the selected category button and that is provided by the source of content represented by the selected source button.

Likewise, these and other advantages of the present invention are achieved by a client, that has a bandwidth capacity, comprising a user machine, that includes a processor, a display, and a memory. The memory includes client software with a personal content manager module containing instructions for generating a dynamic graphical user interface ("GUI"), that is displayed on the display. The dynamic GUI comprises one or more category buttons capable of being selected, wherein the category button(s) represents a category of content that may be accessed by a user, one or more source buttons, including a source button for real-time stream, capable of being selected, wherein the source button(s) represents a source of content that may be accessed by a user, and a content list, wherein one category button and one source button are selected and the content list includes any content, if any, that is within the category of content represented by the selected category button, that is provided by the source of content represented by the selected source button and that has a bandwidth that is less than or equal to the client bandwidth capacity. A system for providing broadband content that comprises a signal origination point that originates broadband content, a transmission medium that receives and transmits the broadband content transmitted from the signal origination point, a service provider that received the transmitted broadband content, and the client described above, wherein the client received the transmitted broadband content from the service provider, also achieves these and other advantages of the present invention.

Further, these and other advantages of the present invention are achieved by a method of personalized content management. The method comprises the steps of receiving input regarding the filtering of broadband content, filtering the broadband content with one or more content categories based on the filtering input, filtering the content with one or more of a plurality of content sources based on the filtering input, and generating a personalized content management interface screen that includes a list of titles of the filtered content. A computer-readable medium containing instructions for performing the above-described method and a user machine comprising a processor and a memory containing instructions, for execution by the processor, for performing the above-described method, also achieve these and other advantages of the present invention.

BRIEF DESCRIPTION OF THE DRAWINGS

The detailed description will refer to the following drawings, in which like numbers refer to like items, and in which:

FIG. 4 is an illustration of an exemplary program nugget.

DETAILED DESCRIPTION OF PREFERRED EMBODIMENTS

Figure 1:
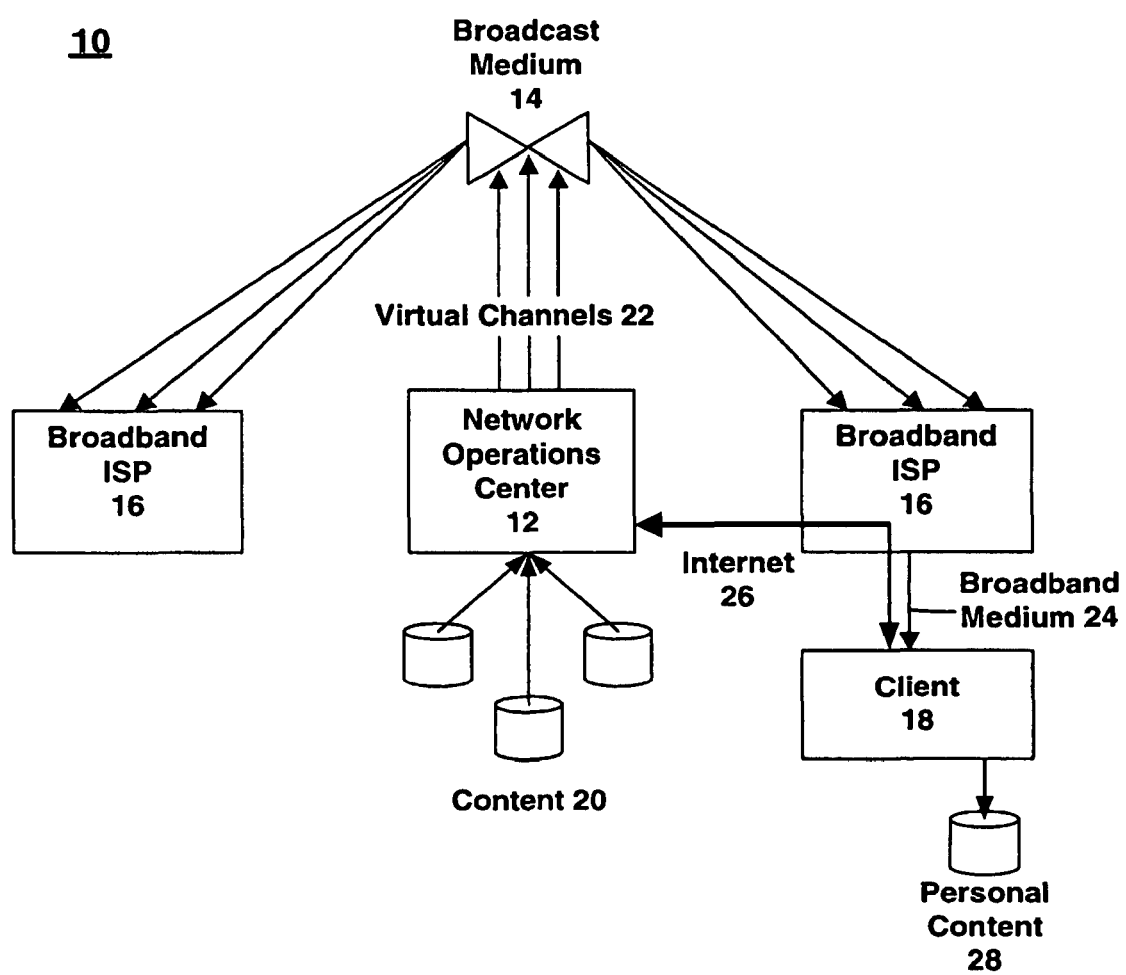
FIG. 1 is a block diagram illustrating a broadband content delivery system.

FIG. 1 illustrates a broadband content delivery system 10 with which the present invention may be used. A personalized content manager (not shown in FIG. 1) is used to manage the broadband content delivered by the broadband content delivery system 10. The illustrative broadband content delivery system 10 comprises a signal origination point 12, a transmission medium 14 (e.g., a satellite), one or more service providers 16, and one or more clients 18. The client 18 typically includes a user machine (e.g., a PC) that includes resident client software. The client software enables access to the broadband content, supports the broadband content delivery system 10 and provides the personalized content manager and the personalized content management interface. Typically, high bandwidth content 20 (e.g., video, audio and web data) is transmitted from a signal origination point 12 such as a Network Operations Center ("NOC") on high-resolution ("high rez") virtual channels 22. The transmission medium 14 is satellite, ether and/or landline, or a combination thereof. The content 20 is received by a service provider 16, typically an edge-of-net broadband Internet service provider ("ISP") and transmitted over a broadband medium 24, such as DSL or coaxial cable, to a client 18. Two-way communications between the client 18 and the NOC 12 are maintained over the Internet 26.

In addition to transmitting the content on virtual channels 22, the broadband content delivery system 10 also transmits a control channel that is received by the client 18. The control channel contains information and instructions that help enable the client 18 to access and control the content 20 provided by the broadband content delivery system 10. The control channel is used to issue commands or directives to the client 18. These commands or directives may result in feedback or a report back from the client 18 to the NOC 12 via the Internet. Significantly, the control channel is used to deliver program descriptors or "program nuggets", which are discussed in detail below.

Not necessarily all clients 18 of the broadband content delivery system 10 will have the bandwidth capability or resources to receive the high bandwidth on high rez virtual channels 22 (e.g., 512 Kbps or more). Accordingly, in addition to high bandwidth content 20, the broadband content delivery system 10 provides low bandwidth content 20 on low-resolution ("low rez") virtual channels 22 (e.g., approximately 200 Kbps) or other communications bandwidth to accommodate these clients. Consequently, when a client 18 signs-on, the broadband content delivery system 10 preferably conducts a bandwidth test to measure client's 18 bandwidth capability ("available bandwidth"). Usually, the available bandwidth is calculated as the maximum bandwidth content that the client 18 can consistently receive.

Figure 2:
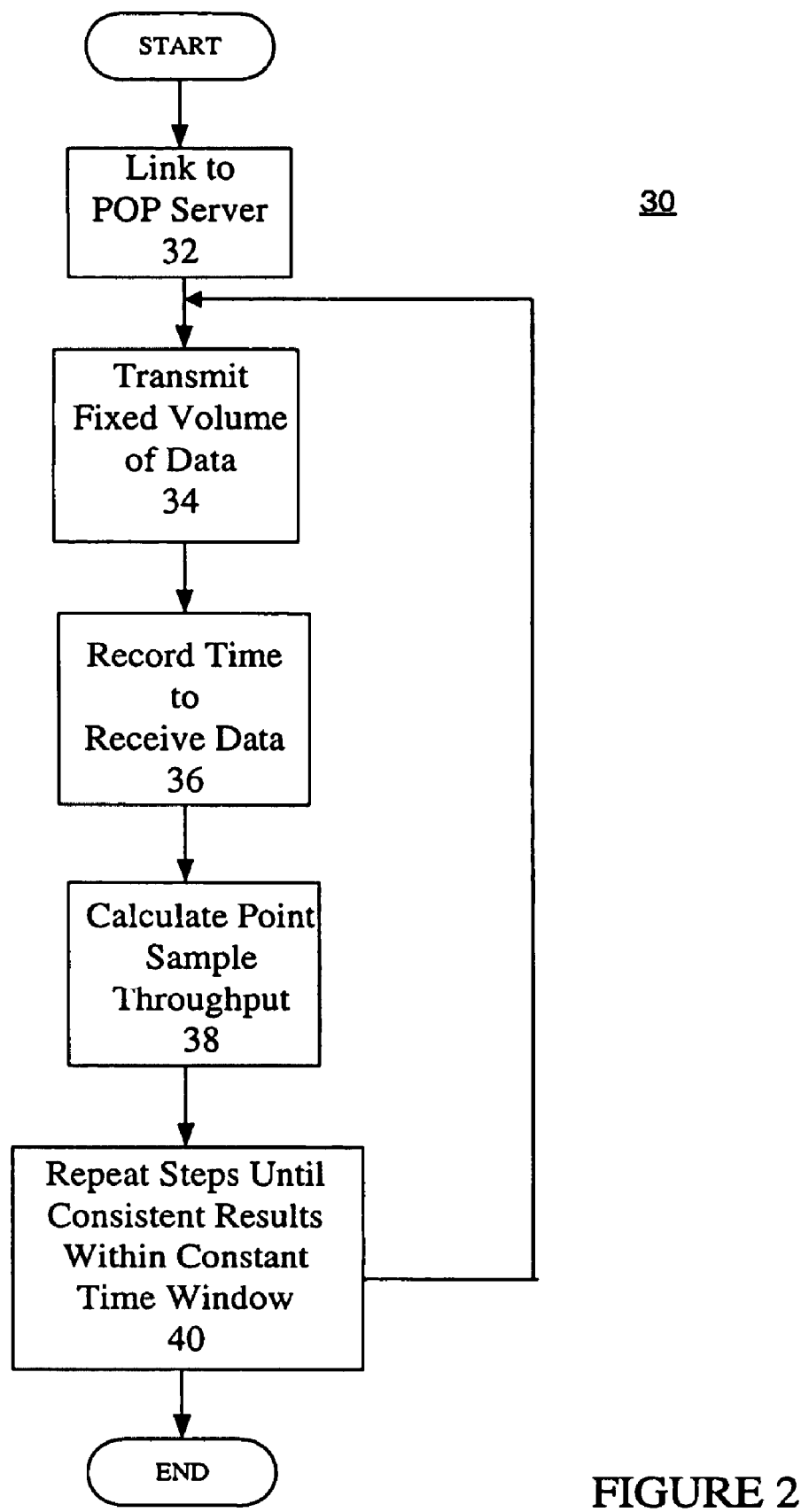
FIG. 2 is a flowchart illustrating a method of bandwidth testing.

As illustrated in the flowchart seen in FIG. 2, an exemplary method 30 of bandwidth testing comprises: client software links 32 to a local system Point of Presence (POP) server at the ISP, via a TCP/IP point to point connection; the POP server transmits 34 a fixed volume of data to the client; the client software records 36 the time required to receive this data; during transmission of the fixed volume of data, the client software calculates 38 a point sample of throughput; and, the preceding are repeated 39 until the results are consistent within a certain constant window of time (e.g., when the results are within a 5% range). In this example the amount of data divided by the time required to receive the data determines the client's 18 available bandwidth. Alternatively, the bandwidth test may be run with the POP server transmitting varying volumes of data to the client 18 to determine if the results change for these different values.

Referring back to FIG. 1, content 20 may be transmitted or broadcast by the NOC 12 on the virtual channels 22 as real-time multicast or unicast streams. A multicast stream comprises streaming content that is directed to and available to multiple clients 18. A unicast stream comprises streaming content that is directed to and available to one client 18. Furthermore, additional content 20 may be provided by third-parties as on-demand broadband content selected from the Internet ("edge-of-net") by a user at the client 18. For example, an ISP 16 may provide the edge-of-net content. Likewise, the user may store selected content, such as portions of the real-time multicast or unicast streams in a local cache at the client 18. This stored or personal content 28 may be kept on a user machine hard-drive or other storage medium.

Figure 3A:
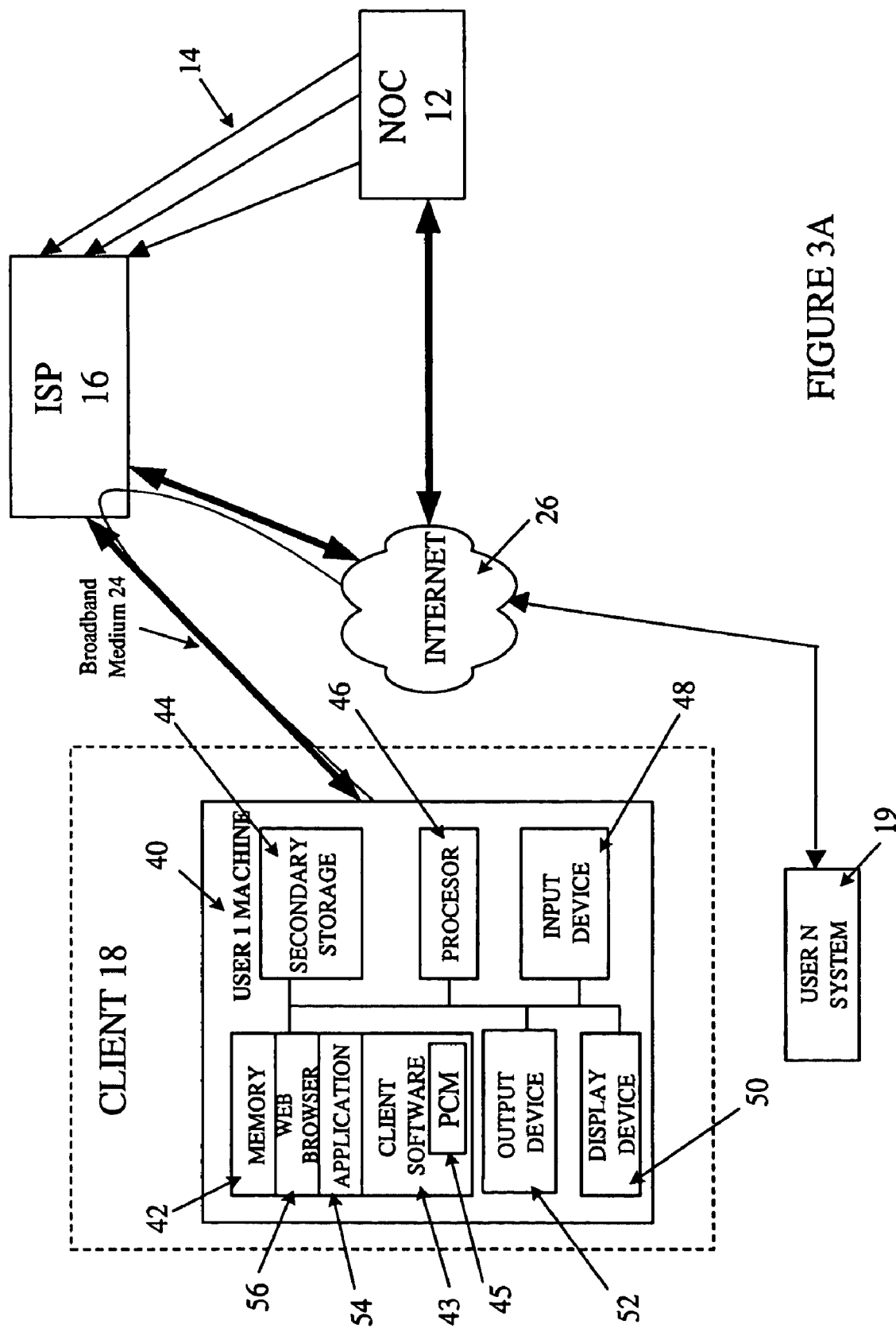
FIGS. 3a and 3b are block diagrams illustrating exemplary components of the broadband content delivery system.
Figure 3B:
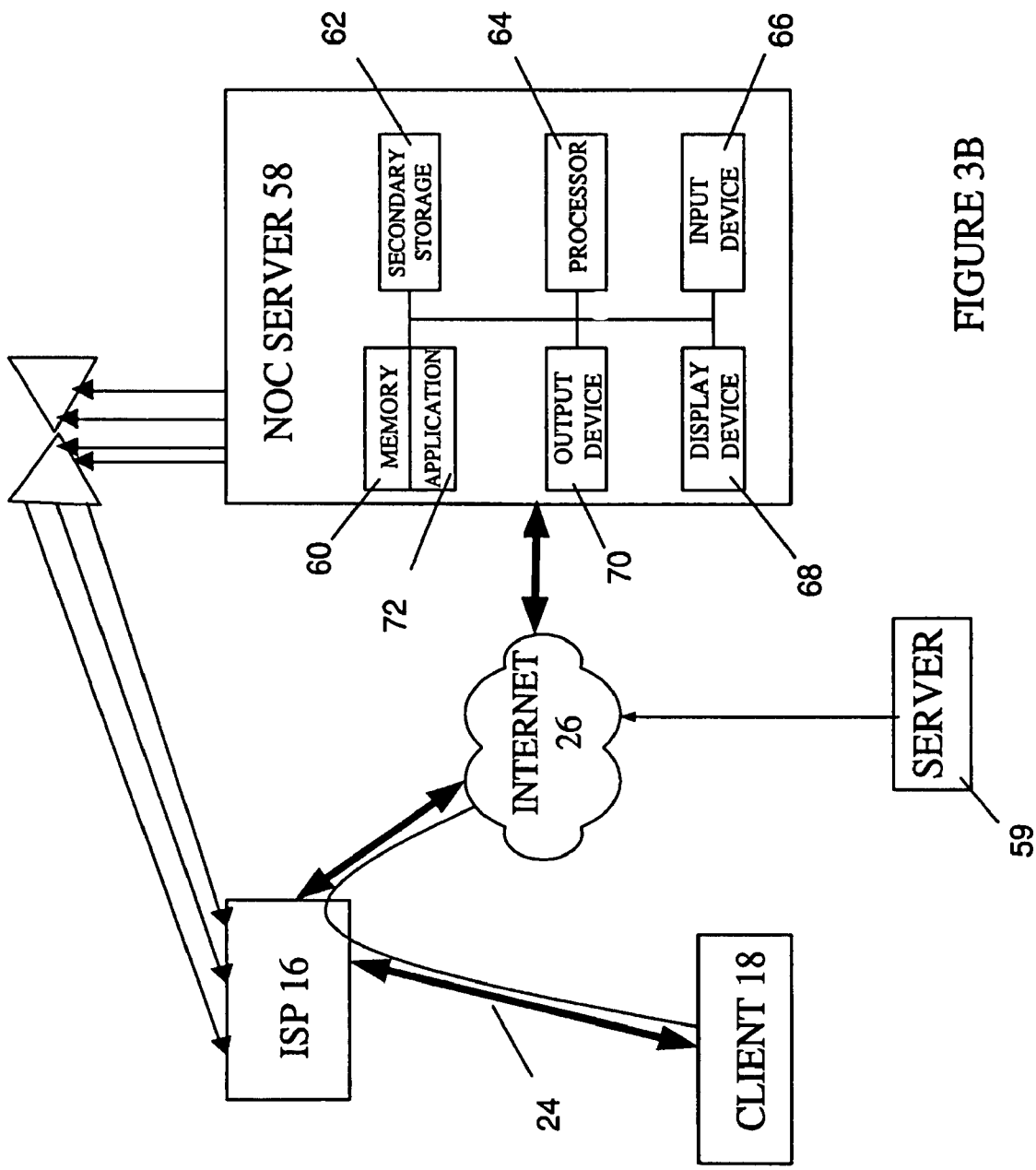

FIGS. 3a and 3b are block diagrams illustrating exemplary hardware components of the broadband content delivery system 10 that may be used for implementing the personalized content manager. FIG. 3a includes the client 18, comprising a user machine 40 connected with a network such as the Internet 26, providing network connections to the NOC 12 and the ISP 16. The user machine 40 includes the client software 43 that the user has downloaded from an ISP 16 or portal or otherwise obtained (e.g., by loading from a CD-ROM or magnetic disk or by being pre-installed on the user machine 40). As mentioned, the client software 43 supports the broadband content delivery system 10 and is executed to run the personalized content manager ("PCM") 45. Preferably, the personalized content manager 45 is a module of the client software 43. Other clients 18, such as client 19 may also be connected with network and may include the same components as client 18.

The user machine 40 illustrates typical components of a user machine. The user machine 40 typically includes a memory 42, a secondary storage device 44, a processor 46, an input device 48, a display device 50, and an output device 52. Memory 42 may include random access memory (RAM) or similar types of memory, and it may store one or more applications 44, including client software 43, and a web browser 56, for execution by processor 46. The secondary storage device 44 may include a hard disk drive, floppy disk drive, CD-ROM drive, or other types of non-volatile data storage.

The local cache that includes a user's personal content 28, and a user's personal profile, may be stored on the secondary storage device 44. The processor 46 may execute client software 43 (including the personalized content management interface 45) and other applications 44 stored in memory 42 or secondary storage 50, or received from the Internet or other network 60. The processor 46 may execute client software 43 in order to provide the functions described in this specification including the personalized content management interface screens and personal content manager 45 functions described below. The input device 48 may include any device for entering information into the user machine 40, such as a keyboard, mouse, cursor-control device, touch-screen, infrared, microphone, digital camera, video recorder or camcorder. The display device 50 may include any type of device for presenting visual information such as, for example, a computer monitor or flat-screen display. The output device 52 may include any type of device for presenting a hard copy of information, such as a printer, and other types of output devices include speakers or any device for providing information in audio form.

The web browser 56 is used to access the personalized content manager 45 and display the personalized content management interface screens, through which the user can manage the broadband content broadcast by the broadband content delivery system 10, as described below. The web browser 56 also is used to access the NOC 12 and ISP 16. Examples of web browsers 56 include the Netscape Navigator program and the Microsoft Internet Explorer program. Any web browser, co-browser, or other application capable of retrieving content from a network and displaying pages or screens may be used.

Examples of user machines 40 for interacting within the broadband content delivery system 10 include personal computers, laptop computers, notebook computers, palm top computers, network computers, Internet appliances, or any processor-controlled device capable of executing a web browser 56 or other type of application for interacting with the broadband content delivery system 10.

FIG. 3b illustrates typical hardware components of a server 58 at the NOC 12. A server 58 at an ISP 16, such as the local system POP server referred to in FIG. 2 above, may have similar hardware components. The server 58 typically includes a memory 60, a secondary storage device 62, a processor 64, an input device 66, a display device 68, and an output device 70. The memory 60 may include RAM or similar types of memory, and it may store one or more applications 64 for execution by processor 64. The secondary storage device 62 may include a hard disk drive, floppy disk drive, CD-ROM drive, or other types of non-volatile data storage. The processor 64 executes application(s) 64, which are stored in memory 60 or secondary storage 74, or received from the Internet 26 or other network. The input device 66 may include any device for entering information into server 58, such as a keyboard, mouse, cursor-control device, touch-screen, infrared, microphone, digital camera, video recorder or camcorder. The display device 68 may include any type of device for presenting visual information such as, for example, a computer monitor or flat-screen display. The output device 70 may include any type of device for presenting a hard copy of information, such as a printer, and other types of output devices include speakers or any device for providing information in audio form.

The server 58 may store a database structure in secondary storage 74, for example, for storing and maintaining information regarding the broadband content delivery system 10 and the clients. For example, it may maintain a relational, object-oriented, or other database for storing information concerning client 18 users, the access rights of the users, their account status and/or a user personal profile.

As mentioned above, processor 46 (and/or processor 64) may execute one or more software applications 54 (or 72), such as client software 43, in order to provide the personalized content manager 45, the personalized content management interface screens, and other functions described in this specification. The processing may be implemented in software, such as software modules, for execution by computers or other machines. Preferably, the personal content manager 45 is a module or component of the client software 43. The processing by processor 46 (and/or processor 64) may provide and support pages, windows and menus (collectively, "screens") described in this specification and otherwise for display on display devices associated with the client 18. The term "screen" refers to any visual element or combinations of visual elements for displaying information or forms; examples include, but are not limited to, graphical user interfaces on a display device or information displayed in web pages or in pop-up windows/menus on a display device. The screens may be formatted, for example, as web pages in HyperText Markup Language (HTML), Extensible Markup Language (XML) or in any other suitable form for presentation on a display device depending upon applications used by users to interact with the broadband content delivery system 10.

The screens include various buttons, as explained below, to provide information or to receive information or commands. The term "button" with respect to screens refers to a particular portion of a screen, possibly including the entire screen. Buttons are selected, for example, to enter information or commands or to retrieve information or access other screens. The selection may occur, for example, by using a cursor-control device to "click on" or "double click on" the button; alternatively, buttons may be selected by entering a series of keystrokes or in other ways such as through voice commands or use of a touch screen. In addition, although the screens described below illustrate a particular arrangement and number of buttons in each screen, other arrangements are possible and different numbers of buttons in the screens may be used to accomplish the same or similar functions of displaying information and receiving information or commands. Also, the same button may be used for performing a number of functions, such as both displaying information and receiving a command.

Although only one server 58 is shown, broadband content delivery system 10 may use multiple servers 59 as necessary or desired to support the users and may also use back-up or redundant servers to prevent network downtime in the event of a failure of a particular server. In addition, although the user machine 40 and server 58 are depicted with various components, one skilled in the art will appreciate that the user machine 40 and the server 58 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as user machine 40 and server 58, to perform a particular method or implementation.

Referring back to FIG. 1, the content 20, whether broadcast as a real-time stream on a virtual channel or provided by a third-party as edge-of net content, comprises chunks of content called programs. Typically each program that is broadcast as a real-time stream on a virtual channel 22 has a corresponding program nugget 74. As discussed above, program nuggets 74 are preferably broadcast or communicated on the control channel. The NOC 12 usually transmits the program nugget 74 at some time preceding the broadcast of the corresponding program. The personalized content manager 45 preferably uses program nuggets 74, and the data contained therein, to manage the content 20 as described below.

An example program nugget 74 is seen in FIG. 4. The program nugget 74 shown includes various information and data related to a corresponding program. For example, this information and data may comprise a program title 76, a program description 78, a rating 80, a program classification 82, a program category name 84, program sub-category names 86, a thumbnail display 88 or link to thumbnail display, a link 90 to a video trailer, a local cache path 92, a local cache filename 94, schedule information 96, pay-per-view information 98, a program ID 100, a source IP address 102, a source TCP Port 104, a bitrate 106 and an expiry date 108 for the program. Other data and information may be included in the program nugget 74.

The program nugget 74 is usually written in Extensible Markup Language ("XML") format, although other formats or languages may be used. If the program nugget 74 is written in XML, the information and data from the program nugget 74 may be easily used to generate or incorporated in a dynamic hyper-text markup language ("DHTML") screen. Typically, the program nugget 74 is stored at the client 18 on the user machine's 40 secondary storage device 44. Program nuggets 74 will usually remain stored at the client 18 at least until the corresponding program is viewed. Consequently, program nuggets 74 corresponding to personal content 28 that the user has saved in the local cache will be available when the user chooses to examine or view the personal content. Alternatively, program nuggets 74 can be re-transmitted or requested at a later time.

Referring back to FIG. 4, an example of the program description 78 is a textual description of the program. The rating 80 indicates the appropriate viewer-ship of the program and may use the MPAA standards. The program classification 82 provides the type of program (e.g., professional baseball game, horror movie, rock music, historical documentary, etcetera) and the general category of the program. For example, a number may indicate the program classification 82. Specific ranges of numbers may indicate a general category (e.g., 1400-1499 may indicate sports programs). A sub-range of numbers within the general category range may indicate a sub-category (e.g., 1400-1405 may indicate baseball programs). Likewise, a specific number may indicate a specific type of program (e.g. 1401 may be professional baseball games). Program classification 82 may also be indicated by other classifications systems, such as combinations of letters, letters and numbers or any similar system. The program category name 84 indicates the general category (e.g., sports) of the program, while the sub-category names 86 indicate sub-categories (e.g., race, Formula 1) of the program.

The thumbnail 88 is usually a video or audio clip of the program. For example, the thumbnail 88 may be a single still screen shot from a program. Likewise, it may be a few seconds of audio from the program or a longer portion of audio from the program. Thumbnails 88 may be provided for all types of content, whether movies, music, information or other types of content. Similarly, the link 90 to a video trailer provides a link to a short (e.g., three minutes) motion video trailer or preview of the program. The video trailer may be broadcast on a virtual channel and/or stored on the user machine's 40 secondary storage device 44. The links to the thumbnail and video trailer preferably identify the name and paths of files comprising the thumbnail and video trailer.

The real-time stream content may include pay-per-view content. Accordingly, for pay-per-view content, the pay-per-view information 98 describes various pay-per-view options, such as one-time viewing only, multiple-viewings, storing in the local cache, a specific time-period for viewing (e.g., a day, week, month, season or year), and includes the pricing for these options. Likewise, the real-time stream content may exclude content that expires. For example, if the user has only paid for one-month of viewing a program, that program will expire one-month after it is purchased. Other programs, which are available for purchase or simply for storing at no cost, preferably expire on a certain date. The expiration date 108 is the date on which the content expires. The program ID 100 is a number that identifies the program.

The program nuggets 74 also contain source data indicating the source of the corresponding program. For example, if a program is a real-time stream program or an edge-of-net program, the source data of the corresponding program nugget 74 will so indicate with the source IP address 102 and the source TCP port 104. If a real-time stream program is stored as personal content 28 in the local cache, the source data of the corresponding program nugget 74 will be modified to reflect that the local cache is the source of the program. For example, the program nugget 74 may include the local cache path 92 and local cache filename if the content is stored in the local cache. The program nuggets 74 may also include bandwidth information (e.g., the bitrate 106) that is used with the bandwidth capability to determine a client's 18 ability to receive the particular content.

The NOC 12 may also transmit program nuggets 74 for edge-of-net content. As with the real-time stream programs, a program nugget 74 for an edge-of-net program will usually be transmitted at some time preceding the broadcast or availability of the corresponding edge-of-net program. The program nuggets 74 for edge-of-net programs may have information and data similar to that discussed above for real-time stream programs. The third-parties that broadcast the edge-of net content preferably provide this information and data to the NOC 12 (or local system POP server) for incorporation in a program nugget 74.

The broadband content delivery system 10 provides a personalized content management interface 45 for its users. The personalized content manager 45 provides personalized content management screens and enables the user to manage the content provided by the multiple sources described above. The user can manage the content 20 from real-time streams, the edge-of-net and the local cache or subset of this content (collectively, hereinafter referred to as content 20). The program nuggets 74, specifically the program classifications 82, program category names 84 and sub-category names 86 in the program nuggets 74, facilitate the organization and sorting of the content into various categories. Likewise, the source data (e.g., source IP address 102, source TCP port 104, local cache path 92 and local cache filename 94) facilitates the organization and sorting of the content 20 by the multiple sources (real-time stream, edge-of-net and local cache). In combination, this data from the program nuggets 74 enables the presentation of content 20 sorted by category and source.

Figure 5:
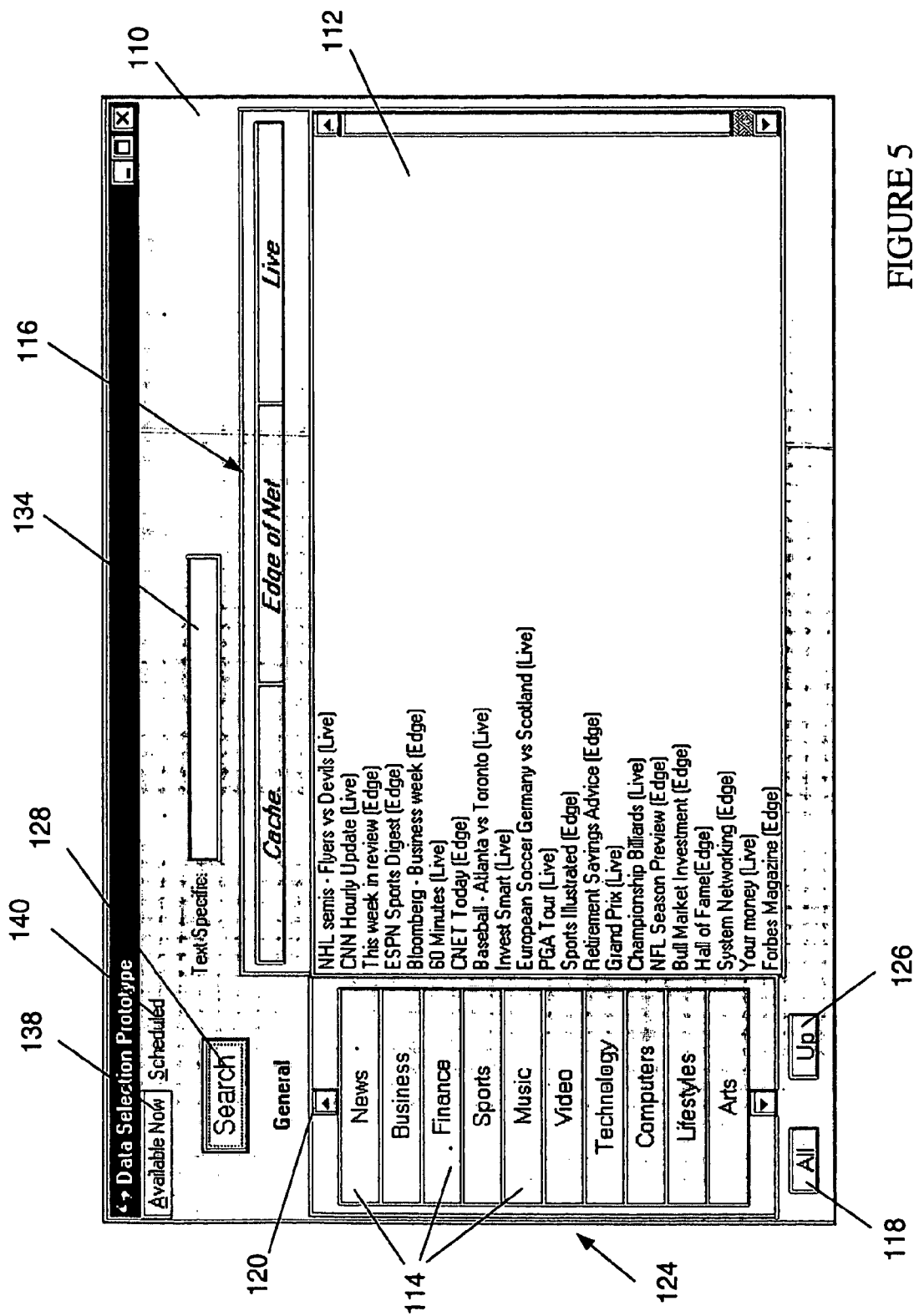
FIGS. 5-7 are illustrations of exemplary personal content management interface screens.

FIG. 5 illustrates an embodiment of a personalized content management interface screen 110. As described above, the personalized content manager 45 is preferably a module of the client software 43. When the personalized content manager 45 module is executed (e.g., by processor 46), it generates the personalized content management screen 110 shown in FIG. 5, and other embodiments of the screen 110 discussed herein. The personalized content management interface screen 110 preferably comprises a dynamic graphical user interface (GUI), as illustrated by the screen in FIG. 5. The dynamic GUI 110 presents the above-described content 20 sorted by category and source. The dynamic GUI 110 is usually a dynamic hyper-text markup language (DHTML) screen, although other formats and languages may be used. The dynamic GUI 110 is preferably displayed on the user machine's 40 display device 50 and may be accessed and controlled with a cursor controlled by the input device 48 (e.g., a cursor-control device, such as a mouse).

In the embodiment shown in FIG. 5, the dynamic GUI 110 comprises an "available now" menu 112 which lists program titles 76 of content that is available for immediate viewing based on the users selection of one or more category buttons 114 (e.g., news, business, finance, sports, music, video, technology, computers, lifestyles and arts) from a list of categories and one or more source buttons 116 (e.g., cache, edge-of-net and live (i.e., real-time streams)) from a list of sources. The category names for the category buttons 114 are preferably taken from program category names 84 of available program nuggets 74. The available now menu 112 further comprises an "all" button 118 that may be highlighted to select all categories. If the all button is highlighted, the available now menu 112 displays program titles 76 of all content available from the selected source buttons 116. Likewise, the available now menu 112 comprises an up arrow 120 and a down arrow 122 which are selected to scroll through the list of categories 124, and an "Up" button 126 which may be highlighted to immediately return to the top of the category list 124. Further, the available now menu 112 comprises a "search" button 128 that is clicked in order to display the content from the highlighted/selected categories 114 and sources 116.

Using the available now menu 112, the user may choose to view available content from specific categories by clicking on the categories' buttons 114 with the cursor, which will highlight the specific categories on the available now menu 112. The user may select any combination of one or more of the available sources by clicking on the source buttons 116. The categories 114 and sources 116 selected may be toggled and more or less may be selected at any time. With category button(s) 114 and source button(s) 116 highlighted, clicking on the search button 128 will cause the dynamic GUI 110 to display a list of program titles 76 of content available in the selected category(ies) from the source(s) selected. Referring to FIG. 5, for example, the user may wish to see news, business, finance, sports and computers content from the edge of net and live (i.e., real-time stream) sources. Once the search button 128 is clicked, all content available from these categories and these sources is listed, by title and source, on the dynamic GUI 110. The DHTML screen comprising this list may be built by extracting information (e.g., program titles 76 and source data) from the program nugget 74 XML files or through other similar means.

The user's selection of categories and sources are the criteria that the personalized content manager 45 utilizes as a filter to determine which titles 76 from which sources to display on the dynamic GUI 110. The personalized content manager 45 compares the categories selected with the program classifications 82 and/or program category names 84 contained in the program nuggets 74 for the available content. If there is a match, then the matched content is filtered for further comparison with the user-selected sources. If there is no match, the content is filtered out. All the matched content is filtered by the selected sources. The source data (e.g., source IP address 102, source TCP port 104, local cache path 92 and local cache filename 94) contained in the program nuggets 74 is compared to the selected sources, and if there is a match, the content's title is displayed on the dynamic GUI 110. If there is no match, the content is not from a selected source and its title 76 will not be displayed. The categories on the dynamic GUI 110 may be classified using a numbering scheme as discussed above for the program classifications. For example, if 1400-1499 is all sports, then any content that has a program classification within this range of numbers will be filtered for further comparison with the user-selected sources. It is specifically noted that the order of filtering may be altered; for example, the content may be filtered by the selected sources and then by the selected categories.

In an alternative embodiment, the All button 118 and all of the source buttons 116 are highlighted in the dynamic GUI's 110 default status so that the dynamic GUI 110 displays a list of all program titles 76 available from all the sources. Further, the dynamic GUI 110 may be configured so that toggling the selected category buttons 114 and source buttons 116 will cause the dynamic GUI 110 to display program titles 76 of content from the selected categories 114 and sources 116 without necessitating the clicking of the search button 128.

Figure 6:
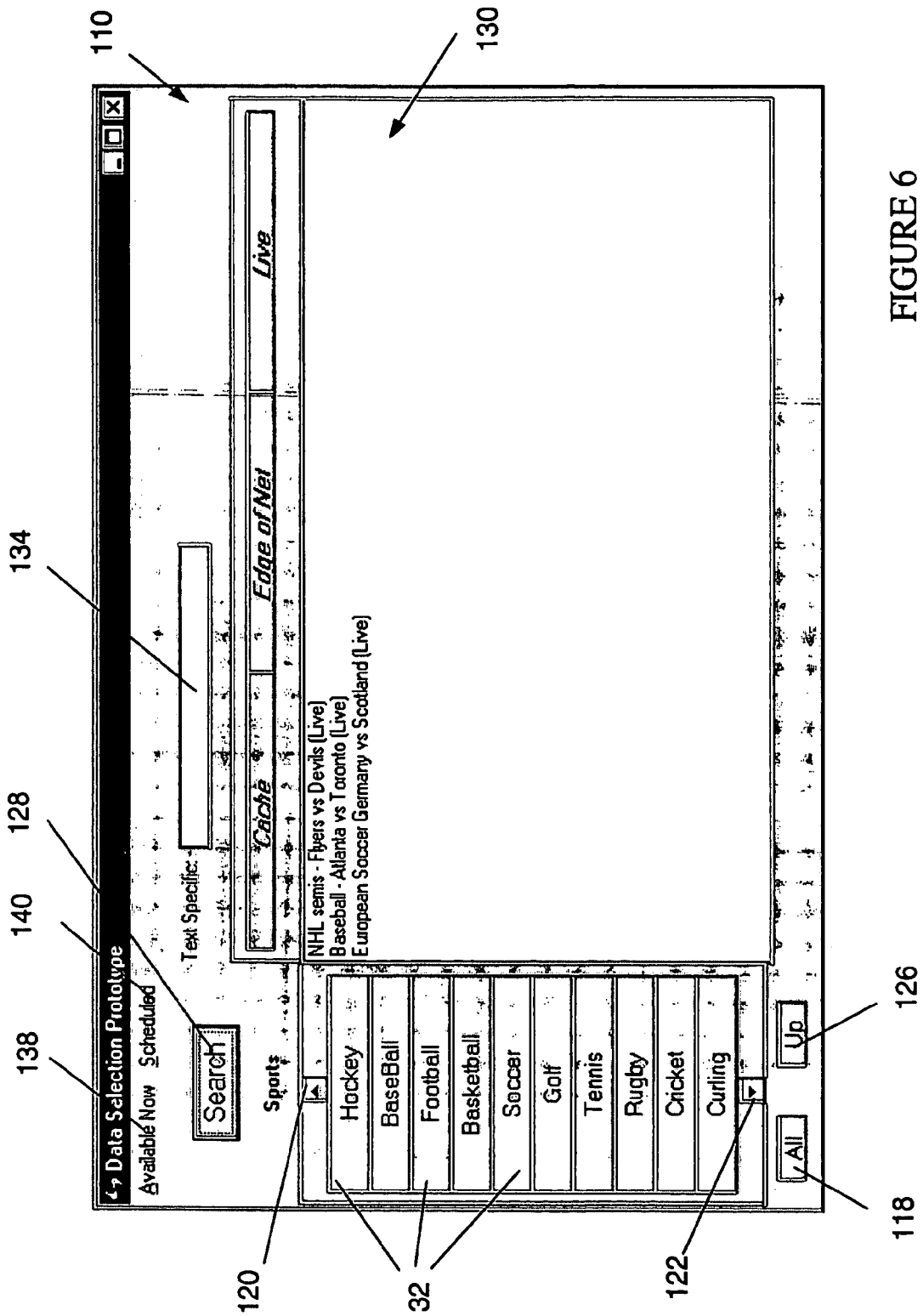

In one embodiment, double-clicking on a category button 114 will cause the dynamic GUI 110 to switch to a specific category menu 130 that corresponds to the double-clicked category button 114. In the example seen in FIG. 6, the sports category button has been double-clicked and the dynamic GUI 110 has switched to a sports category menu. The sports category menu, and indeed any specific category menu 130, is very similar to the normal available now menu 112 displayed in FIG. 5. The primary difference is that the category list 124 has been replaced by a list of sub-category buttons 132 corresponding to sub-categories of the specific category. For example, the sports category menu comprises a list of sub-category buttons including hockey, baseball, football, basketball, soccer, golf, tennis, rugby, cricket and curling. The sub-category names may be taken from the program sub-category names 86 in available program nuggets 74. The specific category menus 30 are operated in much the same manner as the normal available now menu 112. For example, if the user highlights the hockey, baseball and soccer category buttons 114 and the edge of net and live source buttons 116 by clicking on them and clicks the search button 128, the titles 76 of any hockey, baseball or soccer content available from the edge of net or real-time stream will be displayed on the dynamic GUI 110.

Usually each program title 76 in the displayed lists on the dynamic GUI 110 comprises hyper-text. Consequently, when a program title 76 displayed on the dynamic GUI 110 is double-clicked with the cursor or otherwise launched, the dynamic GUI 110 inserts and displays extended information about the selected program. This extended information preferably includes a program description and a hotlink or hyperlink that provides direct access for retrieval and display or recording (caching) of the content. Clicking on the hotlink, for example, may cause the selected program to be displayed with an overlay menu that provides the options of immediate viewing or caching. The extended information may also include additional characteristics of the program retrieved from the program nugget 74 XML. For example, the extended information may include the program description 78, the program classification 82, the source, and/or the program thumbnail 88. The extended information may be presented directly below the selected program title 76 in the program list or as a pop-up or drop-down window. This feature allows the user to learn more about programs before selecting them for viewing or recording. Alternatively, double-clicking on the program title 76 may cause the program to be displayed (e.g., in a screen on the display device 50).

Referring again to FIGS. 5 and 6, the dynamic GUI 110 also comprises a "Text Specific" data field 134. The Text Specific data field 134 allows the user to further refine the displayed program list. Text strings entered into the Text Specific data field 134 may be applied against the program titles 76, program descriptions 78, sub-category names 86 and program types of the listed programs. The user enters a specific text string into the Text Specific data field 134 and clicks the Search button 128, causing the personalized content manager 45 to search the above-mentioned fields of available program nuggets 74 for matches. For example, if the user wanted to locate Philadelphia Flyers® hockey games, it would enter "Philadelphia Flyers" in the Text Specific data field 134 and click the Search button 128. The resultant search will cause the dynamic GUI 110 to display a program list with program titles 76 of programs that had only Philadelphia Flyers® in one of the above-mentioned fields (e.g., program title 76), if there were any available in the content as sorted by the selected categories and sources. Alternatively, a search page or pop-up window that enables the user to conduct a word search may be accessed from a hyperlink on the dynamic GUI 110.

Figure 7:
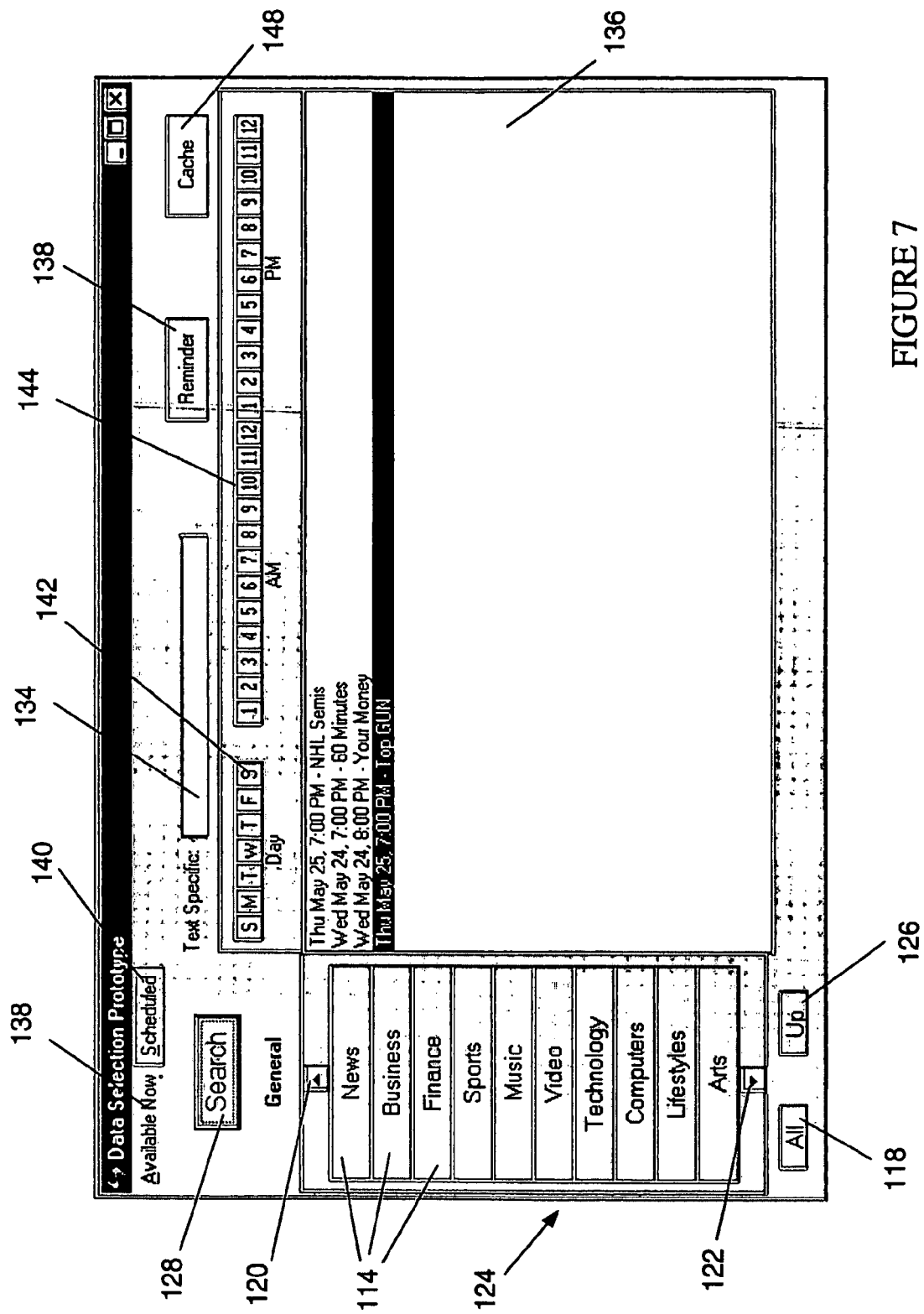

In another embodiment, as shown by FIG. 7, the dynamic GUI 110 comprises a "scheduled" menu 136. Toggling between an "available now" button 138 and "schedule" button 140 on the dynamic GUI 110 may access the scheduled menu 136. The scheduled menu 136 lists program titles 76 of content that will be broadcast live (i.e., as a real-time stream) on a virtual channel at some time in the future. This scheduled content may be selected by the user at any time in advance of broadcast, for automatic caching on the client 18 hard drive and later, on-demand viewing. Similarly, the scheduled content may be selected to provide the user with a reminder when it is broadcast or to be automatically displayed at its scheduled time.

Consequently, like the available now menu 112, the scheduled menu 136 comprises one or more category buttons 114 from a list of categories, up arrow 120 and down arrow 122 buttons, an All button 118, an Up button 126, a Search button 128 and a Text Specific data field 134 that operate as described above. For example, the category buttons 114 may be double-clicked to access a category specific scheduled menu 136. Additionally, the scheduled menu 136 comprises a plurality of day buttons 142 and a plurality of hour buttons 144 (or other increments of time). The day buttons 142 may correspond to the days of the week (i.e., Sunday, Monday, Tuesday, Wednesday, Thursday, Friday and Saturday), as shown in FIG. 7, or alternatively, to the seven (7), ten (10), fourteen (14), etcetera, days including and following the present day as indicated by a number (e.g., 0 represents today and 1-6 represent the next six days). In addition to selecting zero, one or more category buttons 114, the user may select one or more day buttons 142 and, if desired, one or more hour buttons 144 to see the content available on the selected day(s) at any selected time(s) for any selected category(ies). By clicking on the desired category button(s) 114, day button(s) 142 and hour button(s) 144 and clicking the Search button 128, the user causes the Scheduled menu 136 to display a list of program titles 76, including the scheduled day and time of broadcast. With any program title 76 highlighted, the user can click on a reminder button 146, to schedule a reminder when the selected program is broadcast, or a cache button 148, to schedule the caching of the selected program in the user machine's 40 secondary storage device 44.

The dynamic GUIs 110 discussed above may be "Smart Menus" whose selection choices are automatically sorted in order of preference according to an analysis of historical usage accrued in the user's personal profile (a.k.a., user profile). The broadband content delivery system 10 preferably tracks the user's viewing decisions or habits in order to create the user's personal profile. For example, the program classification 78 (and/or program category name 84 and sub-category names 86) for each program that the user views may be recorded, thereby creating a running total of the number of programs from each general category and/or sub-category and/or of each program type that the user views. Accordingly, the user's personal profile will comprise the user's category and type preferences as determined by this running total. For example, if the running total indicates that the user has viewed professional hockey games 85 times out of 100 total programs viewed, the user's personal profile will include a first program type preference for professional hockey games. In the same example, the user's personal profile will also include a first sub-category preference of hockey and a first general category preference of sports. The data comprising the running total and user preferences, as well as the user profile generated from this data, may be stored in the user machine's 40 secondary storage device 44.

Alternatively, the user may proactively create and/or modify the user's personal profile. The user may select program type preferences from a list of program types. Likewise, the user may select sub-category and general category preferences from lists of sub-categories and general categories. Further, the user may modify its user profile by re-ordering its existing preferences. For example, if the user's first program type preference is professional baseball games and the user wants to change this first program type preference to professional football games (e.g., because it is football season), the user may select professional football games from the list of program types. Any changes to the user's personal profile made by a user are also preferably stored in the user machine's 40 secondary storage device 44.

The user's personal profile is preferably used to sort the program lists displayed by the dynamic GUI 110. The user's personal profile preferably is applied to the program lists after the categories selected by the user on the dynamic GUI 110 are determined. For example, if the user's personal profile indicates a first program type preference for professional hockey games since the user has viewed professional hockey games 85% of the time, and the all category is selected, then any professional hockey games that are available from the sources (assuming all the sources are selected) will be displayed at the top or most prominent position of the program list.

If, for the same user as above, the news category is selected, then the first program type preference is irrelevant and inapplicable to the program list. If the remaining program type preferences of the user are also irrelevant and inapplicable to the program list (i.e., because they are for program types that are not included in the news category), the sub-category preferences of the user will be next examined. Since the user's personal profile indicates a first program type preference for professional hockey games since the user has viewed professional hockey games 85% of the time, then the hockey sub-category would be the first sub-category preference indicated by the user's personal profile. Consequently, any news programs that also fell in the hockey sub-category (e.g., a hockey news program) will be displayed at the top or most prominent position of the program list on the dynamic GUI 110.

The user may decide to view available content on the dynamic GUI 110 without the user's personal profile being used to sort the program lists. Accordingly, the dynamic GUI 110 may include a user profile sort hyper-text (not shown). If the user profile sort hyper-text is selected, the program lists will be sorted with the user profile. If the user profile sort hyper-text is de-selected, the program lists will not be sorted with the user profile. If the program lists are not sorted with the user profile, other sorting mechanisms or methods may be used to sort the program lists. For example, the program lists may be sorted in alphabetical order or in chronological order.

Generally it is preferred that the dynamic GUIs 110 described above also do not display program titles 76 of content that the client 18 cannot receive. As discussed previously, not all clients will have the bandwidth capability to receive the high bandwidth on high rez virtual channels 22. Consequently, the personalized content manager 45 preferably filters the content from the multiple sources with the client's 18 bandwidth capability, as determined by the process described above, to prevent the display of such content. Accordingly, the dynamic GUI 110s, such as the available now menu 112 and schedule menu, will not display this non-receivable content.

In alternative embodiments, this non-receivable content is displayed on the dynamic GUI 110. However, in these embodiments, the non-receivable content is displayed in a manner than prevents the user from accessing it. For example, program titles 76 for programs that the client 18 cannot receive may be displayed as normal text that cannot be clicked (e.g., non-hyper-text). These program titles 76 may also be grayed-out to indicate that the user cannot access them. Additionally, these program titles 76 may be hyper-text that is not linked with the corresponding content, therefore preventing access to the content, that may be selected so as to cause the pop-up or pull-down window with the program's characteristics to be displayed. These alternative dynamic GUI 110 embodiments may be used to encourage viewers to purchase additional bandwidth capacity. Advertisements selling expanding bandwidth services may be displayed when content is selected which cannot be accessed due to a client's 18 limited bandwidth.

The method of determining the bandwidth capacity or available bandwidth described above is one example of a number of available methods. The available bandwidth may be requested from the ISP 16 that provides the broadband connection to the client 18. This broadband ISP 16 may know the available bandwidth from previous tests or may perform their own regular tests. Likewise, the broadband ISP 16 may know what the available bandwidth should be based on the equipment installed at the client 18 and the broadband medium used to connect to the client 18. Additionally, the client 18 or a NOC 12 server 58 may store historical records of the client's 18 throughput and determine the client's 18 available bandwidth from these records.

Further, the available bandwidth determined from any of the above methods or means may be used as a starting point for the first method described above. In other words, the available bandwidth may be requested from the ISP 16, and this available bandwidth may be used as a baseline for the test illustrated in FIG. 2. If the test shown in FIG. 2 determined a substantially different available bandwidth than that provided by the ISP 16, the NOC 12 may re-run the test to verify the results.

Figure 8:
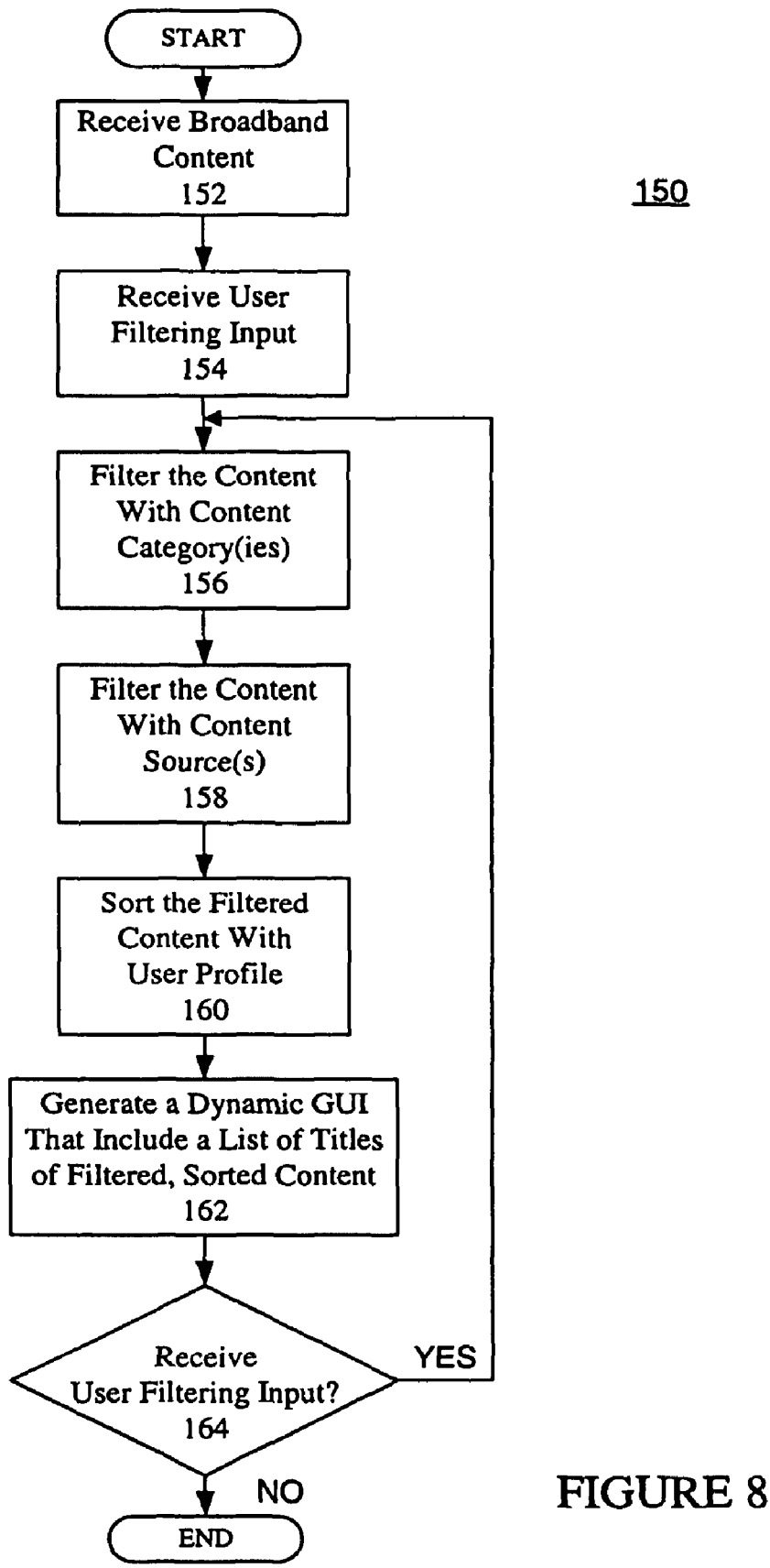
FIGS. 8-13 are flowcharts illustrating exemplary methods of personal content management.

FIG. 8 is a flowchart illustrating an exemplary method 150 of personalized content management, preferably performed by the personalized content manager 45, as described above. As shown, the method 150 comprises the steps of: broadband content 152; receiving filtering input 154; filtering the content with one or more content categories 156; filtering the content with one or more content sources 158; sorting the filtered content with the user profile 160; generating a personalized content management interface screen that includes a list of titles of the filtered and sorted content 162; and, determining if user filtering input is received 164, whereby steps 156-164 are repeated if user filtering input is received.

Receiving broadband content 152 preferably comprises a client 18 receiving broadband content from a plurality of sources, such as from the NOC 12, edge-of-net content from the ISP 16, and personal content from the local cache (e.g., on the user machine 40). The receiving step 152 preferably also comprises receiving a plurality of program nuggets 74. The received program nuggets 74 may correspond to received content, future, scheduled content or available PPV content, for example. Receiving filtering input 154 preferably comprises the personalized content manager 45 receiving filtering input from a user and/or from default settings. Preferably, when the client software 43 is first started by a user, the personalized content manager 45 will generate a personalized content management interface screen in which the content is filtered based on default settings. In this situation, the receiving step 154 will receive the default settings, which may be set by the user and stored on the user machine's 40 secondary storage device 44. Alternatively, the receiving step 154 will receive user filtering input such as selected source(s) buttons 116 and/or selected category button(s) 114. In this situation, the personalized content manager 45 will generate a personalized content management interface screen in which the content is filtered based on the user filtering input alone or in combination with default settings.

Filtering the content with one or more content categories 156 preferably comprises the personalized content manager 45 filtering the received content based on received filtering input related to category. For example, the filtering step 156 may include the personalized content manager 45 comparing user selected or default categories to program nugget category data (e.g., program classification 82, program category names 84, and/or program sub-category names 86) found in the received content's program nuggets 74. If the user selected or default category(ies) matches the program nugget category data of certain content (e.g., a program), then the certain content is not filtered out. Oppositely, if there is no match, the certain content is filtered out.

Filtering the content with one or more content sources 158 preferably comprises the personalized content manager 45 filtering the received content based on received filtering input related to source. For example, the filtering step 158 may include the personalized content manager 45 comparing user selected or default source(s) to program nugget source data (e.g., IP address 102, TCP port 104, local cache path 92, and/or local cache filename 94) found in the received content's program nuggets 74. If the user selected or default source(s) matches the program nugget source data of certain content (e.g., a program), then the certain content is not filtered out. Oppositely, if there is no match, the certain content is filtered out. The order in which the filter steps 156 and 158 are executed is variable.

Sorting the content with the user profile 160 preferable comprises the personalized content manager 45 sorting the received content based on the user's personal profile. As described above, the client software 43 preferably tracks the user's content usage and creates a user personal profile, or user profile, based on this tracking. For example, the client software 43 may store the occurrence or frequency of the user viewing content with a certain program classification 82, category name 84 and/or sub-category name 86. Preferably, the client software 43 ranks the program classifications 82, category names 84 and/or sub-category names 86 of the user's viewed content based on the number of occurrences or frequency of viewing. Alternatively, the user may set or modify the rankings of program classifications 82, category names 84 and/or sub-category names 86 in the user's personal profile. Either way, the sorting step 160 preferably includes the personalized content manager 45 sorting the received content to match rankings of the program classifications 82, category names 84 and/or sub-category names 86 in the user profile. The sorting step 160 is preferably performed after the filtering steps 156 and 158, although it may be performed prior to these steps.

The generating a personalized content management interface screen that includes a list of titles of filtered and sorted content 164 preferably comprises the personalized content manager 45 generating a dynamic GUI 110 (e.g., including menus 112, 130 or 136) that includes the program titles 76 of the certain content that was not filtered out by the filtering steps 156 and 158 and which is sorted by the sorting step 160. The dynamic GUI 110 is preferably displayed by the web browser 56 on the display device 50 of the user machine 40. The dynamic GUI 110 therefore preferably includes content from selected categories (or sub-categories, see specific category menu 132 above) from selected sources (NOC 12, edge-of-net from the ISP 16 or personal content 28 from the local cache).

As discussed above, the dynamic GUI 110 preferably includes numerous sections (e.g., buttons, arrows and/or hyperlinks) through which the user can browse through, search, and further filter the program titles. If the preceding steps are performed in conjunction with the client software 43 start-up, the default settings are preferably used to filter (156 and 158) the content. If the preceding steps are not performed in conjunction with the client software 43 start-up, user filtering input and/or default settings may be used to filter the content. Either way, determining if user filtering input is received 164 preferably comprises the personalized content manager 45 determining if the user selects a section to enter initial user filtering input (e.g., the user first enters filtering input on the first generated and displayed dynamic GUI 110 after client software 43 start-up) or additional user filtering input (e.g., the user enters additional filtering input on a dynamic GUI 110 generated based on previous user filtering input). If the user does enter filtering input, the method 150 preferably repeats steps 156-164.

Figure 9:
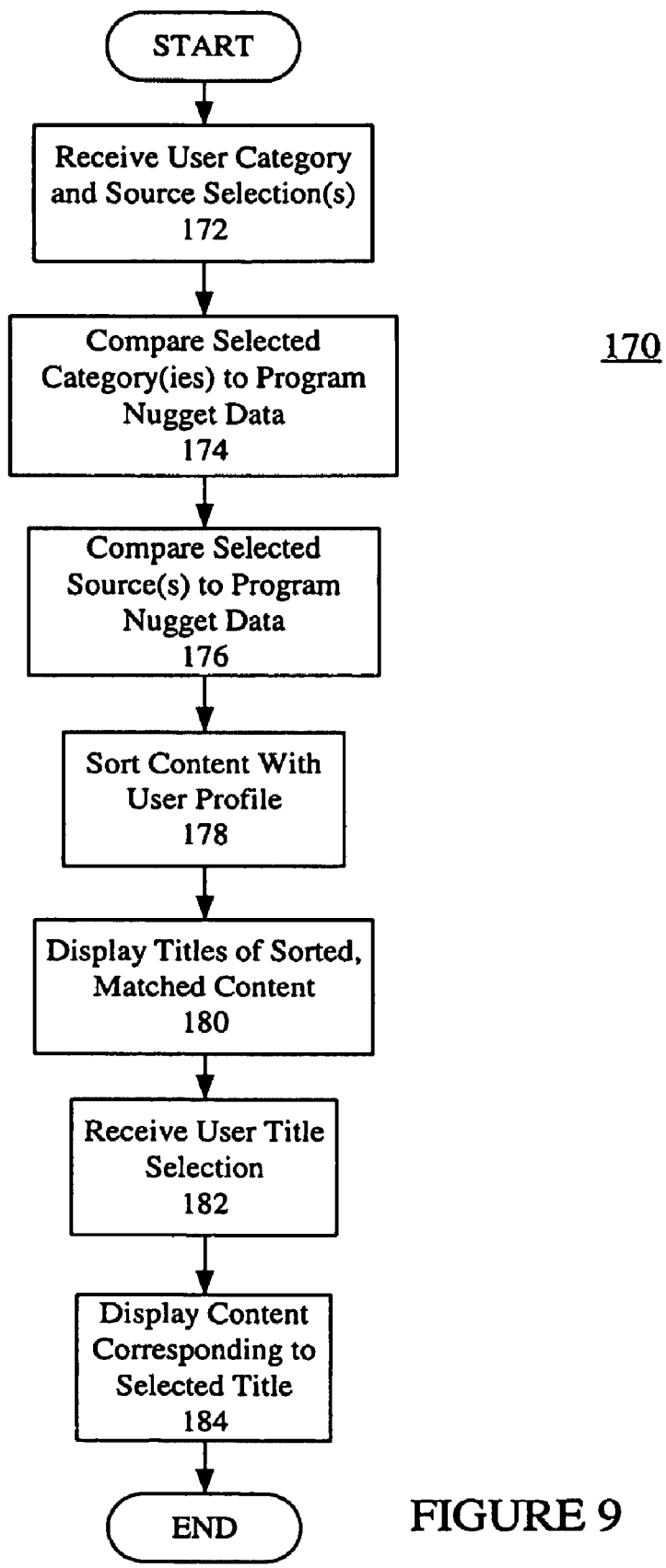

FIG. 9 is a flowchart illustrating an exemplary method 170 of personalized content management, preferably performed by the personalized content manager 45, as described above. The method 170 preferably comprises the steps of: receiving user category and source selection(s) 172; comparing selected category(ies) to program nugget data 174; comparing selected source(s) to program nugget data 176; sorting content with the user profile 178; displaying titles of sorted and matched content 180; receiving user title selection 182; and, displaying content corresponding to selected title 184. Steps 172 to 180 may be performed as described above. For example, the receiving user category and source(s) 172 may include the personalized content manager 45 receiving user selections of category button(s) 114 and source button(s) 116. Likewise, displaying title of sorted and matched content 180 may include the personalized content manager 45 generating a dynamic GUI 110 with the program titles 76 of the filtered and sorted content and displaying the dynamic GUI 110 on the web browser 56 on the display device 50 of the user machine 40.

Receiving user title selection 182 preferably comprises the personalized content manager 45 (and/or client software 43) receiving a user selection of a program title 76 displayed in the dynamic GUI 110 (e.g., including menus 112, 130 or 136). The user may select a program title 76 by clicking on the program title 76, if the program title 76 includes a hyperlink. The hyperlink may be a link to the content corresponding to the selected program title, in which case the client software 43 displays the content corresponding to the selected title 184. Alternatively, as described above, the hyperlink may be a link to a pop-up, pull-down or overlay menu that includes additional options, such as further information regarding the corresponding content (e.g., such as the program description 78 or PPV information 98, if applicable), access to the thumbnail 88 and/or video trailer 90, and/or the link to the corresponding content, for example. Accordingly, the method 170 may also comprise displaying a pop-up, pull-down or overlay menu (not shown), displaying a program description or PPV information (not shown), and/or displaying a thumbnail or video trailer (not shown).

Figure 10:
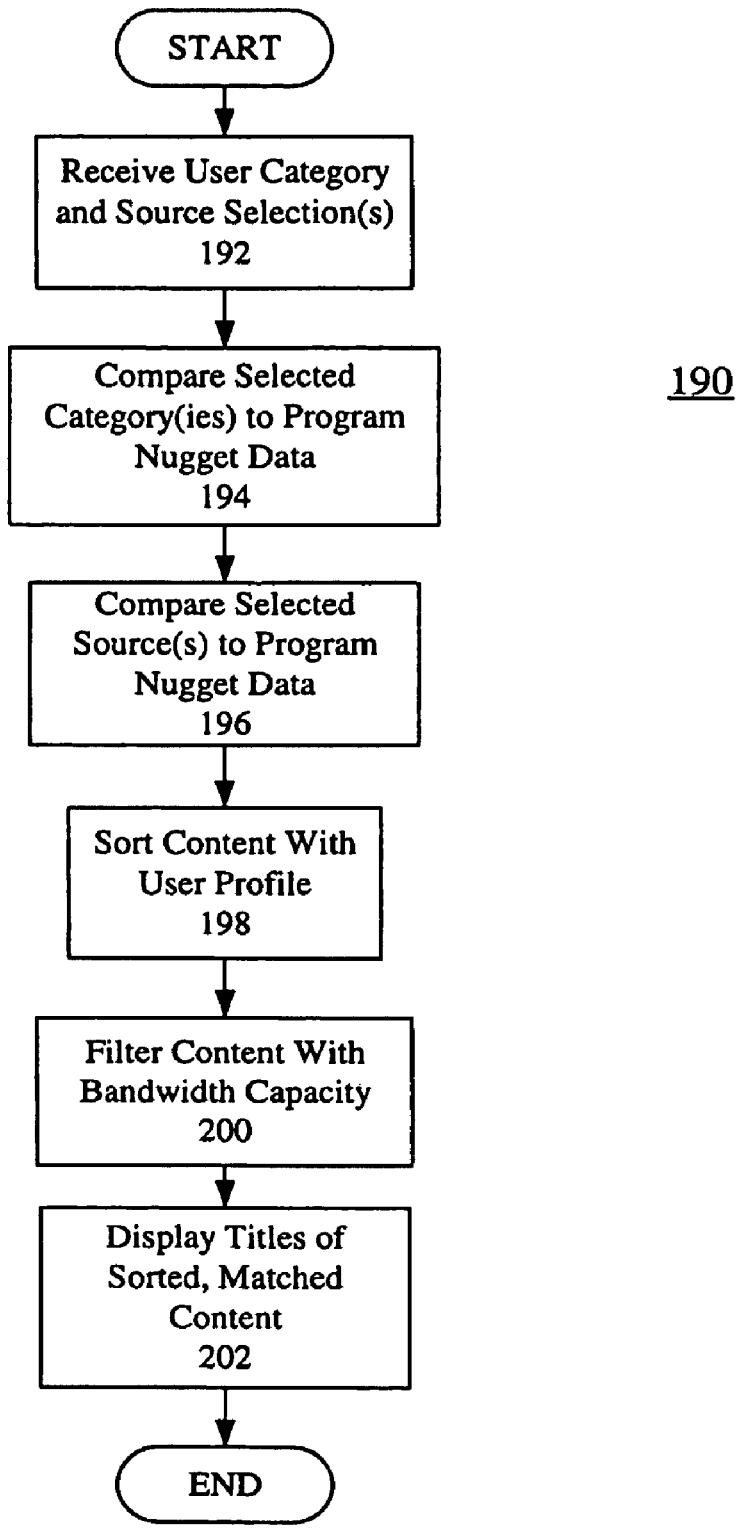

FIG. 10 is a flowchart illustrating an exemplary method 190 of personalized content management, preferably performed by the personalized content manager 45, as described above. The method 190 preferably comprises the steps of: receiving user category and source selection(s) 192; comparing selected category(ies) to program nugget data 194; comparing selected source(s) to program nugget data 196; sorting content with the user profile 198; filtering the content with bandwidth capacity 200; and, displaying titles of sorted and matched content 202. The filtering step 200 preferably comprises the personalized content manager 45 filtering the content with the bandwidth capacity of the client 18 on which the personalized content manager 45 is running. Preferably, the personalized content manager 45 compares the bandwidth capacity to the bitrate 106 in the program nuggets. If the bitrate 106 of certain content exceeds the bandwidth capacity, the certain content is filtered out. As discussed above, the personalized content manager 45 may treat the content filtered out based on bandwidth capacity in a variety of ways. For example, the personalized content manager 45 may exclude the filtered out content from the generated dynamic GUI 110. Alternatively, the personalized content manager 45 may include the filtered out content in the dynamic GUI 110 by including the corresponding program titles 76 grayed-out without hyperlinks or with hyperlinks to pop-ups, pull-downs or overlays that explain why the program title 76 is grayed-out and/or include an offer for expanding the client's 18 bandwidth capacity.

Figure 11:
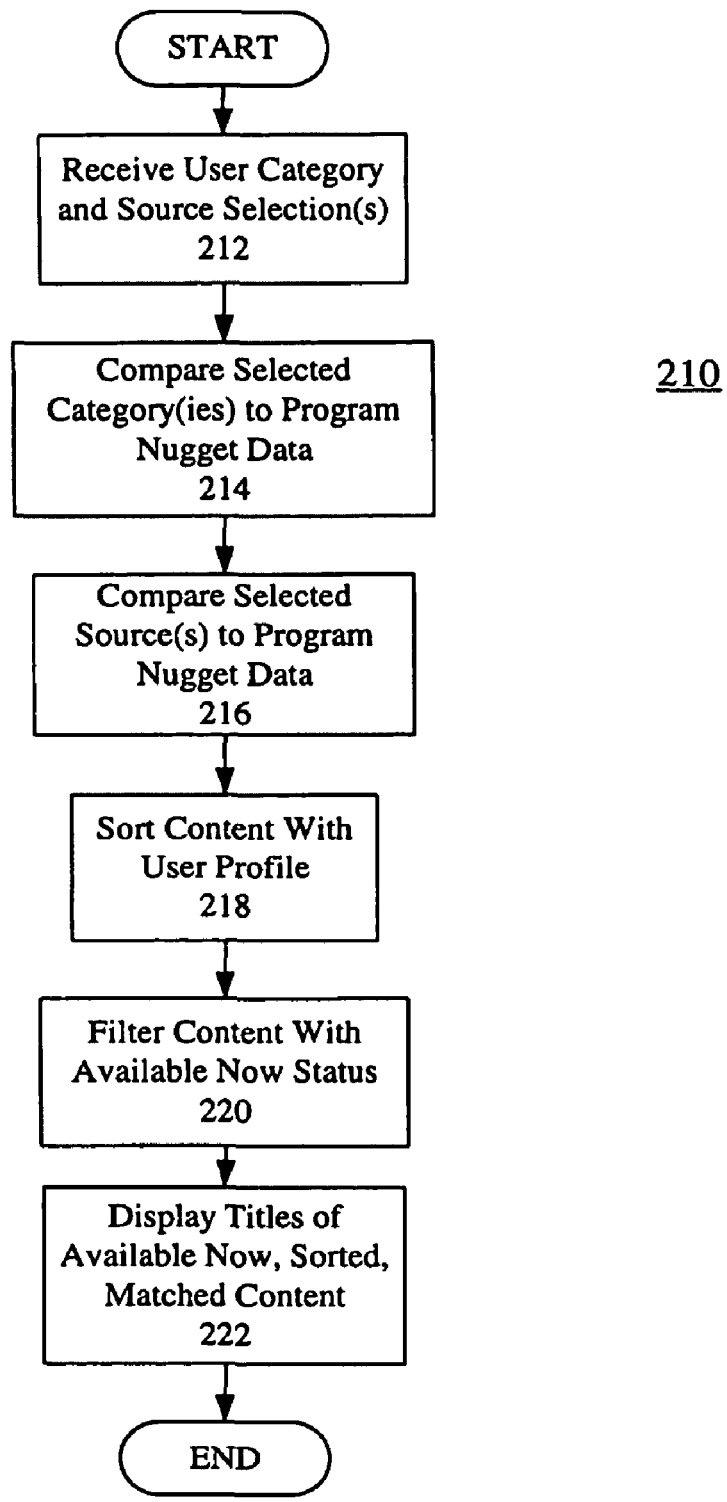

FIG. 11 is a flowchart illustrating an exemplary method 210 of personalized content management, preferably performed by the personalized content manager 45, as described above. The method 210 preferably comprises the steps of: receiving user category and source selection(s) 212; comparing selected category(ies) to program nugget data 214; comparing selected source(s) to program nugget data 216; sorting content with the user profile 218; filtering content with available now status 220; and, displaying titles of available now, sorted and matched content 222. The filtering content with available now status 220 preferably comprises the personalized content manager 45 determining what received content is presently available. Generally, all received content is presently available (notwithstanding bandwidth and other restrictions). However, the system 10 may multicast or unicast content that is available in the future (e.g., PPV content purchased for a scheduled, later viewing). Also, the NOC 12 generally transmits program nuggets 74 in advance of the corresponding content. Therefore, the filtering content with available now status 220 may include the personalized content manager 45 comparing schedule information 96 in program nuggets 74 with the present time and filtering out content that corresponds to program nuggets 74 with schedule information 96 for future times. The displaying titles of available now, sorted and matched content 222 preferably includes the personalized content manager 45 generating a dynamic GUI 110 that includes the available now menu 112. The available now menu 112 is preferably the default setting for the dynamic GUI 110.

Figure 12:
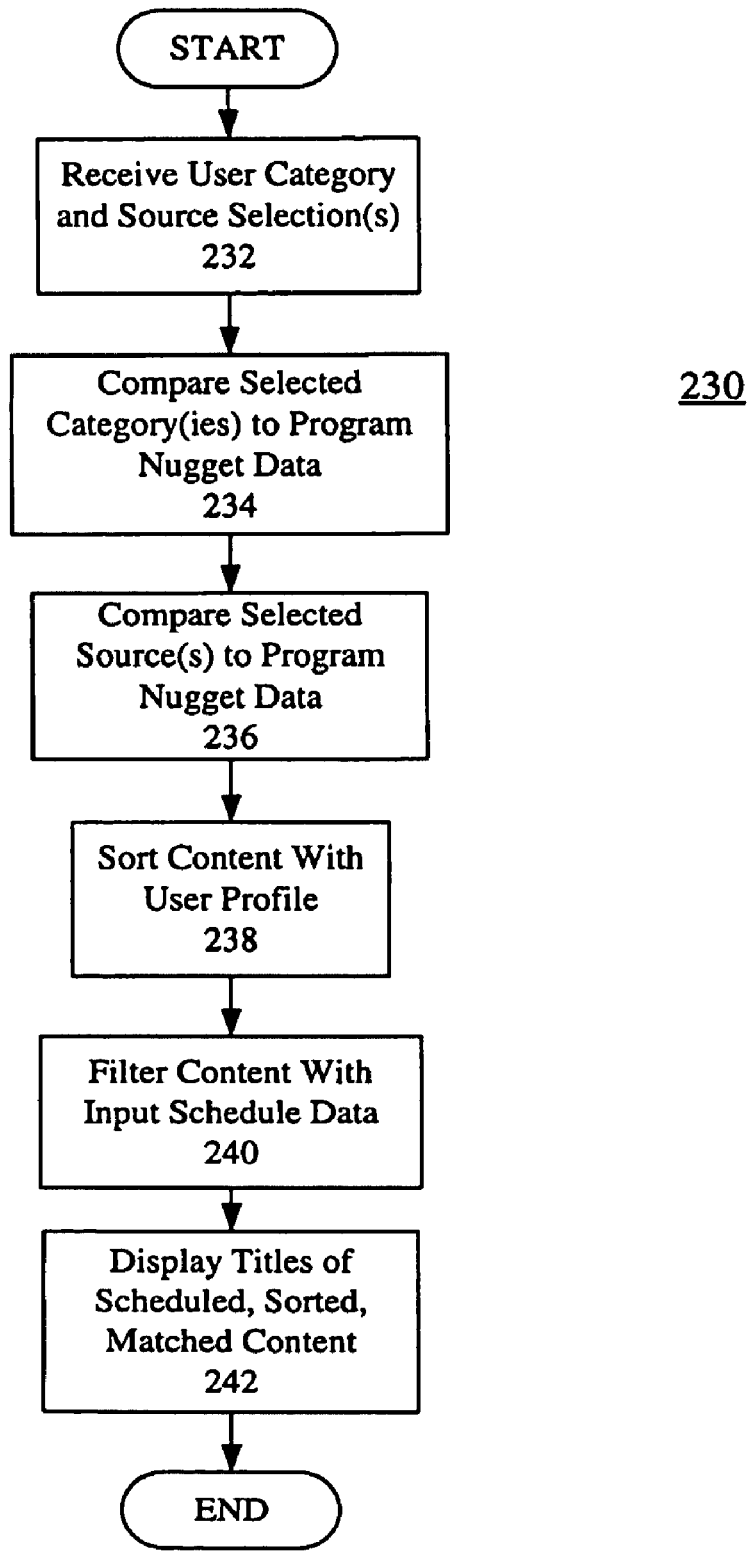

FIG. 12 is a flowchart illustrating an exemplary method 230 of personalized content management, preferably performed by the personalized content manager 45, as described above. The method 230 preferably comprises the steps of: receiving user category and source selection(s) 232; comparing selected category(ies) to program nugget data 234; comparing selected source(s) to program nugget data 236; sorting content with the user profile 238; filtering content with input schedule data 240; and, displaying titles of scheduled, sorted and matched content 242. The filtering content with input schedule data 240 preferably comprises the personalized content manager 45 receiving a user schedule input and filtering the scheduled content based on the user schedule input.

As described above, dynamic GUI 110 preferably comprises a schedule menu button 140 that toggles to the scheduled menu 136. The schedule menu 136 preferably displays scheduled content and includes a plurality of day buttons 142 and hour buttons 144. Accordingly, the filtering content with input schedule data 240 preferably comprises the personalized content manager 45 receiving user selections of one or more day buttons 142 and/or hour buttons 144 and comparing the selected day(s) and/or hour(s) to the schedule information 96 in received program nuggets. The displaying step 242 preferably comprises the personalized content manager 45 generating and displaying a dynamic GUI 110 comprising a scheduled menu 136 that includes schedule content with schedule information 96 that matched the selected day(s) and/or hour(s).

Figure 13:
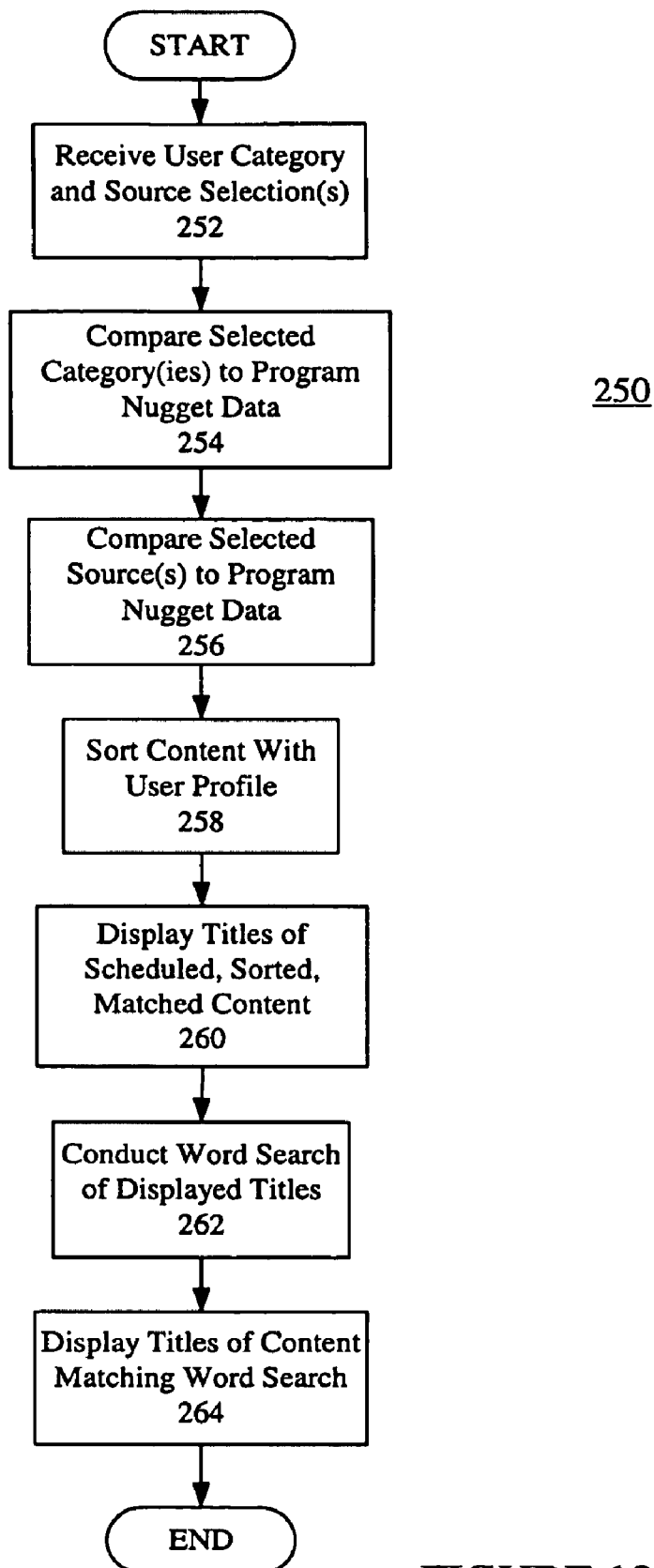

FIG. 13 is a flowchart illustrating an exemplary method 250 of personalized content management, preferably performed by the personalized content manager 45, as described above. The method 250 preferably comprises the steps of: receiving user category and source selection(s) 252; comparing selected category(ies) to program nugget data 254; comparing selected source(s) to program nugget data 256; sorting content with the user profile 258; displaying titles of sorted and matched content 260; conducting a word search of displayed titles 262; and, displaying titles of content matching word search 264. Conducting a word search of displayed titles 262 preferably comprises the personalized content manager 45 receiving a search term input from the text specific data field 134 and comparing the search term to program nugget 74 data. For example, the personalized content manager 45 may compare the search term to program titles 76, program descriptions 78, program ratings 80, program classifications 82, program category names 84, program sub-category names 86, source data, schedule information 96, expiry date 108, etc. The displaying titles of content matching word search 264 preferably includes the personalized content manager 45 generating and displaying a dynamic GUI 110 with program titles 76 corresponding to content that had matching program nugget 74 data.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What we claim is:

1. A personalized content management interface implemented on a computer, comprising:
    a dynamic graphical user interface ("GUI"), comprising:
        one or more category buttons capable of being selected, wherein the category button(s) represents a category of content that may be accessed by a user;
        one or more source buttons, including a source button for real-time multicast stream, capable of being selected, wherein the source button(s) represents a source of content that may be accessed by a user, and wherein the one or more source buttons include a source button for local cache content; and
        a content list, wherein one category button and one source button are selected and the content list includes any content that is within a category of content represented by the selected category button and that is provided by the source of content represented by the selected source button,
    wherein the dynamic GUI is displayed at a client on a display device and the client has a bandwidth capacity, wherein the content list is filtered to only include content that has a bandwidth requirement less than or equal to the bandwidth capacity of the client, and
    wherein after the category of content selected by the user is determined, a user profile that describes the user's viewing habits is developed and applied to the content list to sort the content list according to the user profile.

2. The personalized content management interface of claim 1 wherein the content list comprises a content title that may be selected to access corresponding content.

3. The personalized content management interface of claim 1 wherein the one or more source buttons include a source button for edge-of-net content.

4. The personalized content management interface of claim 1 wherein the dynamic GUI displays available now content.

5. The personalized content management interface of claim 1 wherein the dynamic GUI displays scheduled content.

6. The personalized content management interface of claim 1 comprising a plurality of source buttons, wherein:
    a plurality of source buttons are selected; and
    the content list includes content from the plurality of selected source buttons.

7. The personalized content management interface of claim 1 further comprising a user machine and a display, wherein the dynamic GUI is generated by software resident on the user machine and is displayed on the display.

8. The personalized content management interface of claim 1 wherein the content list is filtered based on received filtering input related to source by comparing one or more user selected sources to program nugget source data found in received program nuggets, wherein program nuggets include content source data and are received with received content.

9. The personalized content management interface of claim 1 wherein a content that is filtered out based the client's bandwidth capacity is excluded from being displayed on the dynamic GUI.

10. The personalized content management interface of claim 1 wherein a content that is filtered out based the client's bandwidth capacity is displayed on the dynamic GUI but grayed-out without hyperlinks.

11. The personalized content management interface of claim 1 wherein a content that is filtered out based the client's bandwidth capacity is displayed on the dynamic GUI but grayed-out with hyperlinks to one or more of pop-ups, pull-downs or overlays that explain why the content is grayed-out.

12. A method of personalized content management, the method being executed at a client with a bandwidth capacity and comprising the steps of:
 displaying a personalized content management interface;
 receiving selection of one or more category buttons;
 receiving selection of one or more source buttons, wherein the source buttons include a multicast stream button and a source button for local cache content; and
 generating a list of content that comprises content titles for content that is within a category of content represented by the selected category button and that is provided by the source of content represented by the selected source button, wherein the generating comprises filtering the list of content to only include content that has a bandwidth requirement that is less than bandwidth capacity of the client, and
 after the category of content selected by the user is determined, developing a user profile that describes the user's viewing habits; and
 sorting the content list according a user profile that describes the user's viewing habits.

13. The method of claim 12 further comprising:
 receiving program nuggets, wherein the program nuggets include content source data and are received with received content; and
 filtering the list of content by comparing by one or more user selected sources to received program nugget content source data.

14. A client, that has a bandwidth capacity, comprising:
 a user machine, that includes:
  a processor;
  a display; and
  a memory that includes client software with a personal content manager module containing instructions for generating:
   a dynamic graphical user interface ("GUI"), that is displayed on the display, the dynamic GUI comprising:
    one or more category buttons capable of being selected, wherein the category button(s) represents a category of content that may be accessed by a user;
    one or more source buttons, including a source button for real-time stream, capable of being selected, wherein the source button(s) represents a source of content that may be accessed by a user, and wherein the one or more source buttons include a source button for local cache content; and
    a content list, wherein one category button and one source button are selected and the content list includes any content, if any, that is within a category of content represented by the selected category button, that is provided by the source of content represented by the selected source button and that has a bandwidth that is less than or equal to the client bandwidth capacity,
   wherein the dynamic GUI is displayed at a client on a display device and the client has a bandwidth capacity, wherein the content list is filtered to only include content that has a bandwidth requirement less than or equal to the bandwidth capacity of the client, and
   wherein after the category of content selected by the user is determined, a user profile that describes the user's viewing habits is developed and applied to the content list to sort the content list according to the user profile.

15. A system for providing broadband content that comprises:
 a signal origination point that originates broadband content;
 a transmission medium that receives and transmits the broadband content transmitted from the signal origination point;
 a service provider that received the transmitted broadband content; and
 the client of claim 14, wherein the client received the transmitted broadband content from the service provider.

* * * * *